United States Patent [19]

Price

[11] 4,332,841
[45] Jun. 1, 1982

[54] MOLD PREPARATION METHOD

[75] Inventor: Paul F. Price, Indianapolis, Ind.

[73] Assignee: RCA Corporation, New York, N.Y.

[21] Appl. No.: 219,219

[22] Filed: Dec. 22, 1980

[51] Int. Cl.$^3$ ............................................. B44D 1/20
[52] U.S. Cl. ..................................... 427/135; 134/40; 134/26; 264/39
[58] Field of Search .................. 264/39, 107; 425/225, 425/1, 810; 134/40, 26; 427/135, 133

[56] References Cited

U.S. PATENT DOCUMENTS 3,671,290  6/1972  Matsumoto ........................... 134/26
3,850,721  11/1974  Schubert ............................... 134/26

OTHER PUBLICATIONS

Metal & Alloys, Processes & Procedure, Metal Clean, No. 1, Mar. 1944.

Primary Examiner—Sam Silverberg
Attorney, Agent, or Firm—B. E. Morris; H. F. VanDenburgh

[57] ABSTRACT

A method for the preparation of a mold for use in molding high density information discs includes treating the exposed surfaces of the mold with a solvent to remove any foreign matter therefrom. This step is followed by treating the exposed surfaces of the mold with a cleaning and drying agent to remove any remaining solvent. This is followed by applying a coating of an antistatic agent to the surfaces of the mold. The method is completed by applying a coating of a mold lubricant to the surfaces of the mold.

12 Claims, No Drawings

MOLD PREPARATION METHOD

This invention relates to a mold used in making recorded discs. More particularly, the present invention pertains to a process for preparing a mold for use in molding high density information records, such as video discs, from plastic molding compositions.

BACKGROUND OF THE INVENTION

Recorded discs or records are generally flat circular plates of a plastic material having a center hole therethrough and having recorded information provided on one or both major surfaces of the disc in the form of surface relief patterns. The surface relief patterns are preferably formed in a spiral groove in the major surfaces of the disc, and the center portions and edge portions of the major surfaces of the disc are generally left blank.

Recently there has been developed a high density information recorded disc, such as a video disc, in which there is a very high packing density of the grooves containing the surface relief pattern, on the order of about 10,000 grooves per inch (4,000 grooves per centimeter). To achieve such a high packing density, the grooves must be very narrow, on the order of about 2.7 microns in width, and very shallow, on the order of about 4,000 angstroms in depth. The disc is played with a stylus having a very fine tip which rides in the groove containing the surface relief pattern; and during play of the record, the same is rotated at a relatively high speed, on the order of about 450 r.p.m. Due to the fineness of the grooves and the fine dimensions of the surface relief pattern, any defects or scratches on the surface of the disc can severely disrupt the information in a large number of the grooves and adversely affect the operation of the disc.

A molding apparatus or mold press for molding these high density information recorded discs, such as a video disc, generally includes a pair of opposed mold plates or members, at least one of which is movable toward and away from the other, and which when together form a mold cavity therebetween of the size and shape of the disc to be formed. Secured on the opposed surface of each mold plate is a separate stamper of a thin metal sheet which has on its surface the negative of the surface relief pattern to be formed in the surface of the disc. The stampers generally have an opening in the center thereof and are secured to their respective mold plates by a clamping ring around the outer edge of the stamper and a center hold-down plate extending through the opening in the stamper and engaging the stamper at the edge of the center opening. The center hold-down plates are secured in openings in the mold plates.

One type of these high density information discs is made from a resinous plastic material which is filled with conductive particles, such as carbon black particles, so that the disc is thereby made conductive. However, this type of disc is much more brittle and abrasive than discs which do not contain the conductive particles.

Due to the fine dimensions of the grooves and the surface relief patterns in the grooves, as well as the special materials used in the fabrication of these discs, many of the requirements involved in the molding of and the processes for the replication of these high density information discs are different from those previously used to make audio records. An example of this is that caution must be exercised in the preparation for use and use of the molds or mold members employed in the molding of these high density information discs. If caution is not followed, the mold members may damage the stampers secured thereto, which, in turn, will result in defects in each and every disc molded using the damaged stampers.

Additionally, it is important to be able to clean the mold members, such as by the removal of any debris, dirt, dust, lint, fingerprints, and any other foreign materials from the surfaces of the molds, and to maintain the molds in a clean condition and free of such foreign matter, which could cause damage to the stampers and defects in the discs molded therefrom. Therefore, it would be desirable to develop a method for preparing the molds for use in the molding process and apparatus and for maintaining all foreign matter out of the stamper/mold interface.

SUMMARY OF THE INVENTION

A method for preparing a mold including an upper and lower mold member which is to be used in a record molding apparatus for the molding of high quality, high density information discs, such as video discs, from plastic molding compositions includes treating the exposed surfaces of the mold members with a solvent to remove any dirt, grit, debris, lint, dust, fingerprints, or any other foreign matter therefrom. The mold is further prepared by treating the exposed surfaces of the mold members with a cleaning and drying agent to remove any remaining solvent thereon and by applying a coating of an antistatic agent to these surfaces. The method is completed by applying a coating of a mold lubricant to the surfaces of the mold members.

DETAILED DESCRIPTION OF THE INVENTION

The pair of molds or mold members which are prepared by the process of this invention for use in molding high density information records, such as video discs, are normally found mounted in and attached to a molding apparatus or mold press. These molds or mold members are also often referred to as mold plates or platens. By use and custom, the upper mold member or platen has come to be identified as the "B" mold, whereas, the lower mold member or plate has by custom and usage come to be known as the "A" mold.

The mold preparation method of this invention is begun by working with the upper mold method or "B" mold. The first step in the process is to remove the gear and rod assembly from this upper mold member so as to expose and completely open the center passageway or opening extending through the center of this mold member. Once the gear and rod assembly has been removed from the mold member, exposing the passageway extending through the center thereof, this center opening or passageway is cleaned. The cleaning of the opening is accomplished by working downward from the above the mold press with a wire brush such as to thoroughly clean the passageway. The cleaning of the opening is continued by flushing the same with a solvent or cleaning agent, such as acetone. The solvent or cleaning agent is sprayed downward from above the press from a squeeze or spray bottle to thoroughly flush the center opening. The cleaning of the passageway is completed by blowing the same dry with filtered air.

The process for preparing and cleaning the mold is continued by cleaning the gear and rod assembly, previously removed from the center opening of the upper mold member, with a solvent solution. The preferred solvent solution is naphtha, and the same is sprayed on the gear and rod assembly from a spray or squeeze bottle to clean these parts of the mold. The cleaning of these pieces is completed by wiping the same with a lint-free cloth. Thereafter, this gear and rod assembly is reinstalled in the passageway extending through the center of the upper mold member contained within the mold press.

Next in this method or process for mold preparation, a lint-free cloth is moistened with a solvent, such as mineral spirits or preferably naphtha. Thereafter, the flat surfaces of both the upper and lower mold members are wiped with the so moistened lint-free cloth. Also, the ring well, guide pins, and all other exposed areas of the mold members are cleaned by wiping with the solvent (naphtha) moistened lint-free cloth. Now, a Q-tip is moistened with a solvent, preferably naphtha, and the center hole and crevices in the outer periphery of both the top and bottom mold members are cleaned with the so moistened Q-tip. Additional Q-tips are moistened with solvent and used as may be required. Thereafter, another lint-free cloth is moistened with a cleaning and drying agent, preferably acetone. The flat surfaces of both the upper and lower mold members are wiped with this acetone-moistened cloth to remove any naphtha remaining on these surfaces and to dry the same.

The next step in the process for preparing the mold or mold members of this invention involves the development or attaining of a static-free surface on those portions of the mold members which will be exposed and, in particular, those areas of the mold members which will come into contact with the stampers. This is obtained by carefully wiping the areas of stamper contact of the mold members with a lint-free cloth which has been dampened with an antistatic or stop-static agent. A preferable antistatic agent to be used in this procedure of the process is one which is known as "Rycoline Stop Static", and commercially available from the Rycoline Solvent Company. Preferably, this antistatic agent is sprayed from a pressurized can onto a lint-free cloth and either blown with filtered air or allowed to partially dry thereon for a short period of time. The area of stamper contact on both the upper and lower mold members is then carefully wiped with the thus sprayed and dried lint-free cloth. Additionally, the ring well, as well as the guide pins, and all other exposed areas of the mold members are carefully wiped with the same lint-free cloth which has been sprayed with the antistatic agent (preferably "Rycoline Stop Static") and permitted to partially dry thereon prior to its use. Thereafter, filtered air is blown over the entire surface area of each of the upper and lower mold members to remove any dust and lint that may be remaining on the surfaces thereof. During this blowing of filtered air, care is taken to see that the last areas of the mold members that are treated are the areas that will come into contact with the stampers when they are mounted on the mold members.

The mold preparation method is continued by next cleaning the center plates and hold-down rings away from the molding apparatus or mold press. This is accomplished by first dampening or moistening a lint-free cloth with a solvent, such as mineral spirits or preferably naphtha, and carefully wiping the center plates and then the hold-down rings with the thus moistened lint-free cloth. Thereafter, these parts are treated with a cleaning and drying agent, preferably acetone, to complete the cleaning thereof. This last step is carried out by moistening or dampening a lint-free cloth with the cleaning and drying agent, such as acetone, sprayed from a squeeze or spray bottle onto the cloth. The thus acetone-moistened cloth is used to carefully wipe the center plates and hold-down rings to remove any naphtha remaining thereon and generally dry these parts of the molding apparatus or mold press. Now, the center plates and hold-down rings are likely sprayed with an antistatic or stop-static agent, preferably "Rycoline Stop Static", to attain a coating thereon and develop a static-free surface on these parts of the mold press. Thereafter, the thus cleaned and treated center plates and hold-down rings, along with the stampers which are to be used in the mold press contained in their protective containers, are placed adjacent the record molding apparatus for subsequent mounting therein and use therewith in molding high density information discs, such as video discs.

Continuing with the method or process of this invention for preparing a mold for use in molding high density information records, such as video discs, from plastic molding compositions, the mold faces or those portions of the mold members coming in contact with the stampers are lubricated. This is accomplished by pouring a small amount of a mold lubricant on a lint-free cloth and thereafter carefully wiping the so moistened cloth over the face of one (for instance, the upper or "B") of the mold members in a circular motion to evenly distribute the oil or mold lubricant over the mold face or surface of the mold member which comes in contact with the stamper. Now the face or surface which comes in contact with the stamper of the other (for instance, the lower or "A") mold or mold member is treated in a like manner by carefully wiping the same in a circular motion with the lubricant moistened lint-free cloth to obtain an even distribution of the mold lubricant over the entire surface or face. A typical mold lubricant that can be used is silicone oil; however, a preferred mold lubricant is "Tri-flon", a synthesized lubricant containing teflon which is commercially available from the Tri-flon Company.

The next step in the mold preparation method is a final inspection and removal of any remaining lint, dust, or any other foreign matter from the mold. This treatment is performed on both the upper ("B") and lower ("A") mold members or plates. In this step of the process a high intensity light, such as a portable Spectrolite high intensity lamp, is used in a darkened room to aid in highlighting the dust and lint particles to be removed. Also in this step, use is made of an air hose having a special nozzle, such as a deionizing nozzle commercially available from the 3M Company, to blow the lint, dust, and any other foreign matter off the mold surface. The lint and foreign matter removal of this step is begun with the upper or "B" mold plate. The room is darkened and the high intensity light is aimed at the mold surface at an acute angle (an angle of about 35 degrees with a horizontal is preferred). As the light is directed on the mold surface and rotated thereabout, the air hose with special nozzle is used to blow all remaining dust, lint, and any other foreign matter off of the mold surface. This same procedure is then followed with the lower or "A" mold member. In performing this step of the method, care should be exercised to insure that the direction of blowing the lint and foreign matter off the mold surface with the air hoze and nozzle is not counter to the direction of the ambient air flow in the room where the molding apparatus or mold press is located. Additionally, if the mold press is located in a clean room environment, be it a tent or other more permanently enclosed area in the disc manufacturing facility, care should be exercised to insure that the blowing with air hose and nozzle of the mold surface to clear the same of lint and foreign material is done in a direction other than a direction counter to the clean air flow set up by the clean room environment to prevent any dust, lint, or foreign material from blowing back onto the mold surfaces.

Following the above, the mold or mold members are prepared and ready to receive the stampers for mounting thereto and subsequent use in the molding apparatus or mold press for molding high density information discs, such as video discs.

The process of this invention for preparing a mold for use in molding high density information records, such as video discs, from plastic molding compositions provides a means for removing any debris, dirt, dust, lint, fingerprints and the like and any other foreign material from the mold or mold members and a means of aiding in maintaining the stamper/mold interface free from any foreign matter to thereby protect the stampers from possible damage and aid in the production of high density information discs of high quality.

What is claimed is:

1. A method for preparing a mold including an upper and lower mold member for use in a record molding apparatus for the molding of high density information discs from a plastic molding composition comprising the steps of:
   treating the exposed surfaces of both the upper and lower mold members with a solvent to remove any grit, dirt, debris, dust, lint, fingerprints, or any other foreign matter therefrom,
   treating the exposed surfaces of both the upper and lower mold members with a cleaning and drying agent to remove any solvent remaining thereon and to completely dry the exposed surfaces,
   applying a coating of an antistatic agent to the surface and other exposed areas of both the upper and lower mold members, and
   applying a coating of a mold lubricant to the surface of both the upper and lower mold members.

2. A method in accordance with claim 1 wherein the solvent used in treating the surfaces of the mold members is naphtha.

3. A method in accordance with claim 1 wherein the cleaning and drying agent used in treating the surfaces of the mold members is acetone.

4. A method in accordance with claim 1 wherein the lubricant applied to the surfaces of the mold members is a silicone oil.

5. A method in accordance with claim 1 wherein the step of applying a coating of an antistatic agent to the surface and other exposed areas of both the upper and lower mold members further includes the steps of spraying a lint-free cloth with an antistatic agent to thereby dampen the cloth, partially drying the antistatic agent on the cloth, and thereafter wiping the surface and other exposed areas of both the upper and lower mold members with the sprayed and partially dried lint-free cloth to thereby apply a thin coating of the antistatic agent thereto.

6. A method in accordance with claim 1 wherein the solvent used in treating the exposed surfaces of both the upper and lower mold members is naphtha, the cleaning and drying agent used in treating the exposed surfaces of both the upper and lower mold members is acetone, and wherein the treating steps using naphtha and acetone further include the steps of moistening a lint-free cloth with the treating agent and thereafter wiping the exposed surfaces of both the upper and lower mold members with the so moistened lint-free cloth.

7. A method in accordance with claim 1 wherein the step of applying the coating of mold lubricant further includes the steps of moistening a lint-free cloth with the mold lubricant and thereafter wiping the surface of both the upper and lower mold members with the so moistened lint-free cloth in a circular motion to evenly distribute the mold lubricant over the surface.

8. A method in accordance with claim 1 wherein in each step of the method the upper mold member is processed prior to the processing of the lower mold member.

9. A method in accordance with claim 1 further including the step of blowing filtered, pressurized air over the entire surface area of both the upper and lower mold members to remove any dust and lint remaining thereon after the step of applying the coating of antistatic agent.

10. A method in accordance with claim 1 further including the step of treating the surface of both the upper and lower mold members with filtered, pressurized air to remove any remaining lint or foreign matter therefrom after the step of applying the coating of mold lubricant.

11. A method in accordance with claim 1 further including, preparing the center plate and hold-down ring portions of each mold member, at a point remote from the molding apparatus prior to the step of applying the coating of mold lubricant, by the steps of:
   treating the center plates and hold-down rings with a solvent to remove any grit, dirt, debris, dust, lint, fingerprints, or any other foreign matter therefrom,
   treating the center plates and hold-down rings with a cleaning and drying agent to remove any solvent remaining thereon and to completely dry the same, and
   applying a coating of an antistatic agent to the center plates and hold-down rings.

12. A method in accordance with claim 1 further including the steps of removing the gear and rod assembly from the upper mold member, cleaning with a solvent the opening remaining in the upper mold member following the removal of the gear and rod assembly, cleaning with a solvent the gear and rod assembly at a point remote from the molding apparatus, and reinstalling the gear and rod assembly in the upper mold member prior to the treating with a solvent step.

* * * * *